United States Patent
Oh et al.

(10) Patent No.: US 10,875,814 B2
(45) Date of Patent: Dec. 29, 2020

(54) CORE-SHELL PARTICLES, POLYMER ELECTROLYTE MEMBRANE COMPRISING SAME, FUEL CELL OR ELECTROCHEMICAL CELL COMPRISING POLYMER ELECTROLYTE MEMBRANE, AND METHOD FOR MANUFACTURING CORE-SHELL PARTICLES

(71) Applicant: LG CHEM, LTD., Seoul (KR)

(72) Inventors: Keunhwan Oh, Daejeon (KR); Sunhwa Kim, Daejeon (KR); Hyuk Kim, Daejeon (KR); Sangwoo Lee, Daejeon (KR); Curie Park, Daejeon (KR); Insung Bae, Daejeon (KR)

(73) Assignee: LG CHEM, LTD., Seoul (KR)

( * ) Notice: Subject to any disclaimer, the term of this patent is extended or adjusted under 35 U.S.C. 154(b) by 344 days.

(21) Appl. No.: 15/762,026

(22) PCT Filed: Feb. 17, 2017

(86) PCT No.: PCT/KR2017/001764
§ 371 (c)(1),
(2) Date: Mar. 21, 2018

(87) PCT Pub. No.: WO2017/142344
PCT Pub. Date: Aug. 24, 2017

(65) Prior Publication Data
US 2018/0282230 A1  Oct. 4, 2018

(30) Foreign Application Priority Data
Feb. 18, 2016  (KR) ........................ 10-2016-0019154

(51) Int. Cl.
*C04B 35/628* (2006.01)
*H01M 8/1004* (2016.01)
(Continued)

(52) U.S. Cl.
CPC .. *C04B 35/62897* (2013.01); *C04B 35/62802* (2013.01); *H01M 8/1004* (2013.01);
(Continued)

(58) Field of Classification Search
CPC .... C04B 2235/3229; C04B 2235/3232; C04B 2235/3244; C04B 2235/3293;
(Continued)

(56) References Cited

U.S. PATENT DOCUMENTS

2010/0104918 A1*  4/2010  Nowak ............... H01M 8/1048
429/492

FOREIGN PATENT DOCUMENTS

| CN | 102898573 | 1/2013 |
| CN | 103588808 | 2/2014 |

(Continued)

OTHER PUBLICATIONS

Kim et al., "A review of polymer-nanocomposite electrolyte membranes for fuel cell application," Journal of Industrial and Engineering Chemistry, vol. 21:36-52 (2015).
(Continued)

*Primary Examiner* — Lingwen R Zeng
(74) *Attorney, Agent, or Firm* — Dentons US LLP

(57) ABSTRACT

A core-shell particle with a ceramic core and a hydrogel shell provided on a surface of the ceramic core, wherein the hydrogel shell is formed through polymerizing a monomer comprising a first compound having an ethylenically unsaturated group and a functional group capable of forming hydrogen bonds with water and a second compound having two or more ethylenically unsaturated groups and an inorganic element, a polymer electrolyte membrane including the core-shell particle, a fuel cell or an electrochemical cell including the polymer electrolyte membrane, and a method for preparing a core-shell particle.

17 Claims, 5 Drawing Sheets

(51) Int. Cl.
*H01M 8/1041* (2016.01)
*H01M 8/1053* (2016.01)

(52) U.S. Cl.
CPC ....... *H01M 8/1053* (2013.01); *H01M 8/1055* (2013.01); *C04B 2235/3229* (2013.01); *C04B 2235/3232* (2013.01); *C04B 2235/3244* (2013.01); *C04B 2235/3293* (2013.01); *C04B 2235/3418* (2013.01); *C04B 2235/5445* (2013.01); *C04B 2235/5454* (2013.01); *Y02E 60/50* (2013.01); *Y02P 70/50* (2015.11)

(58) Field of Classification Search
CPC .... C04B 2235/3418; C04B 2235/5445; C04B 2235/5454; C04B 35/62802; C04B 35/62897; H01M 8/1004; H01M 8/1053; H01M 8/1055; Y02E 60/523; Y02E 60/50; Y02P 70/56; Y02P 70/50
See application file for complete search history.

(56) References Cited

FOREIGN PATENT DOCUMENTS

| | | |
|---|---|---|
| JP | 2005302365 | 10/2005 |
| KR | 10-2003-0062857 | 7/2003 |
| KR | 10-1112693 | 2/2012 |
| KR | 10-2013-0012090 | 2/2013 |
| KR | 10-2015-0044710 | 4/2015 |
| KR | 10-2015-0056122 | 5/2015 |

OTHER PUBLICATIONS

Kim et al., "Composite proton conducting membranes based on Nation and sulfonated SiO2 nanoparticles," Journal of Membrane Science, vols. 415-416: 696-701 (2012).

* cited by examiner

【FIG. 1】
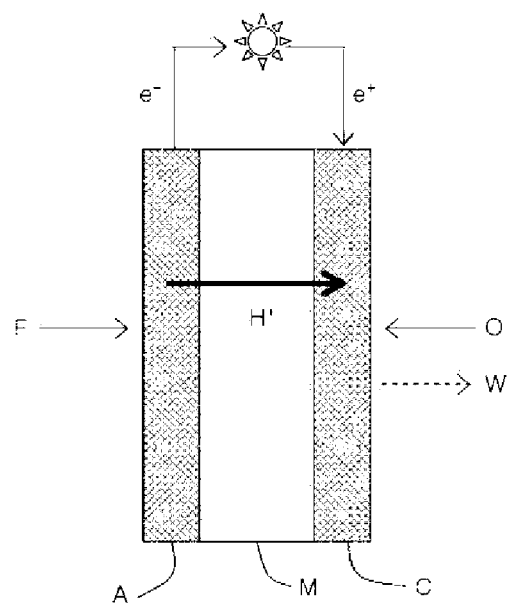
【FIG. 2】
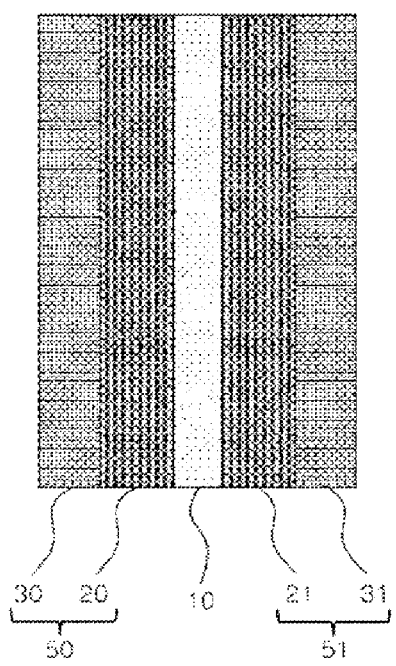

[FIG. 3]
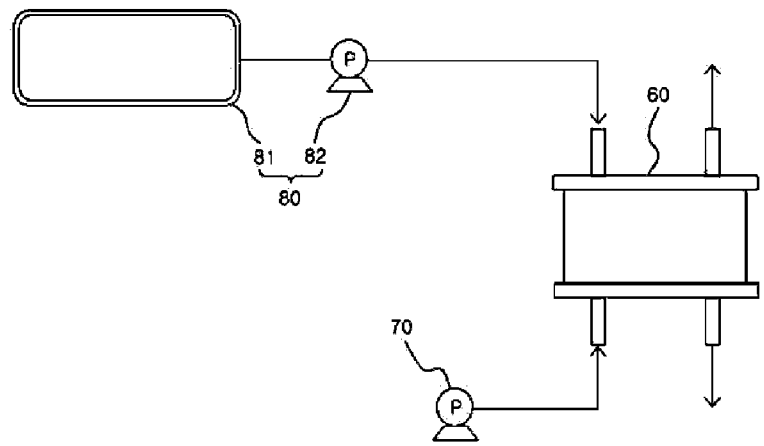
[FIG. 4]
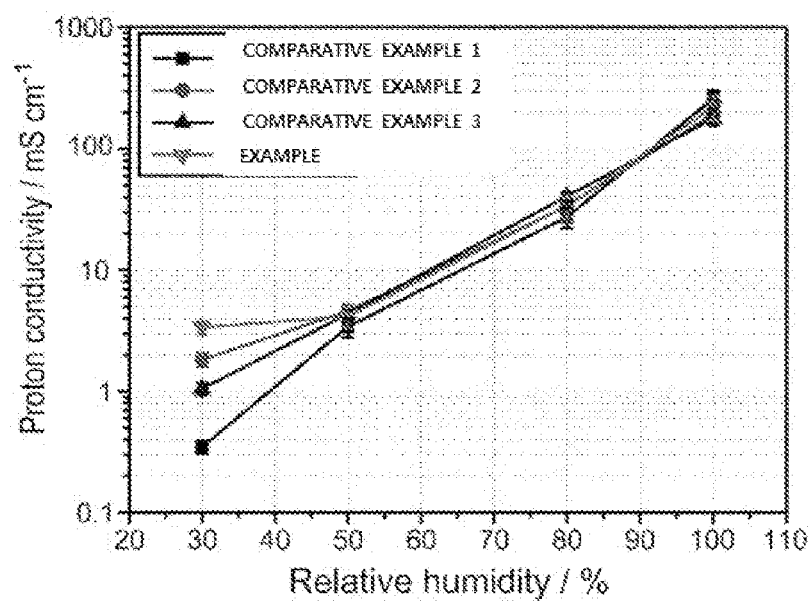

[FIG. 5]
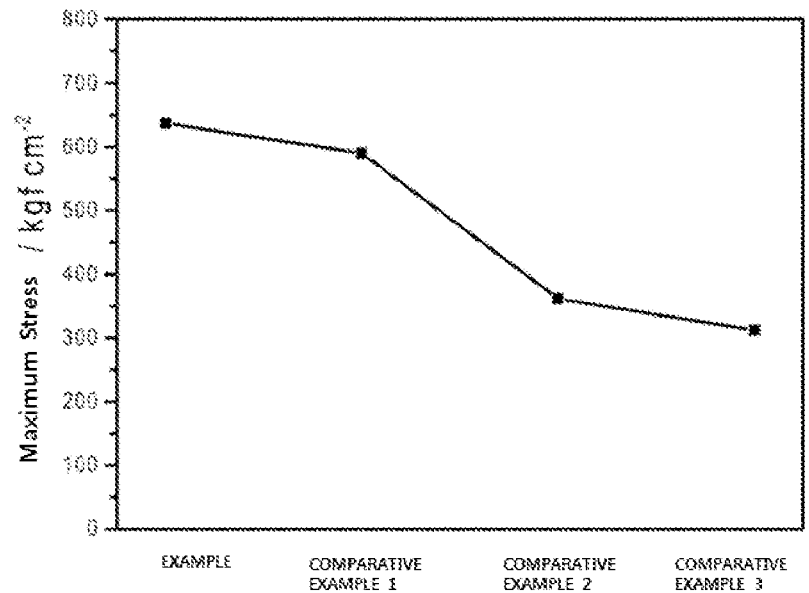
[FIG. 6]
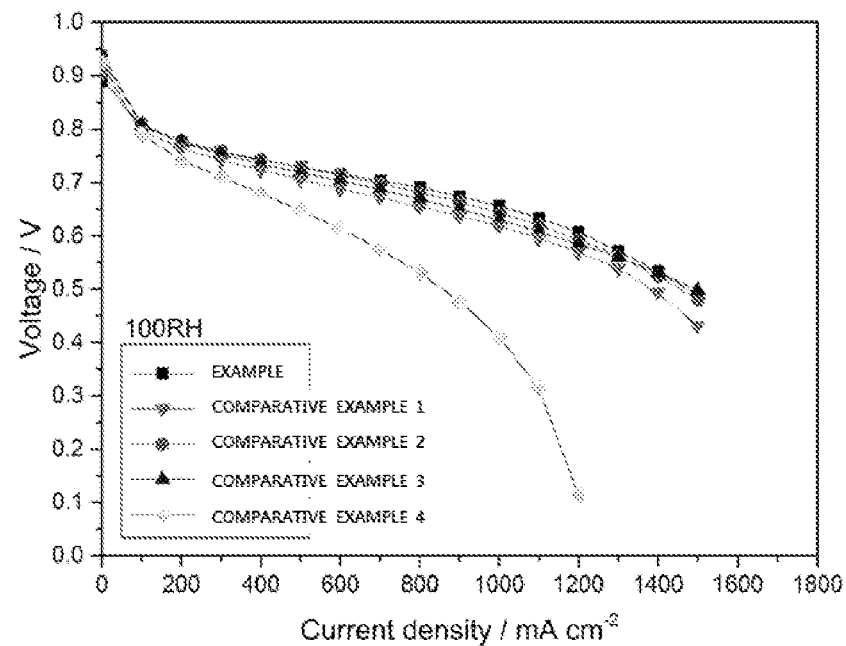

【FIG. 7】
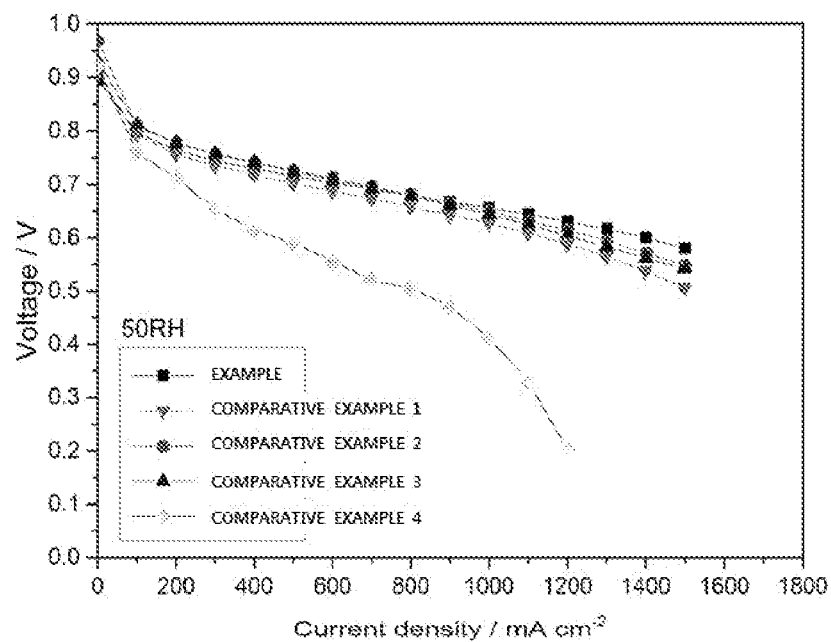
【FIG. 8】
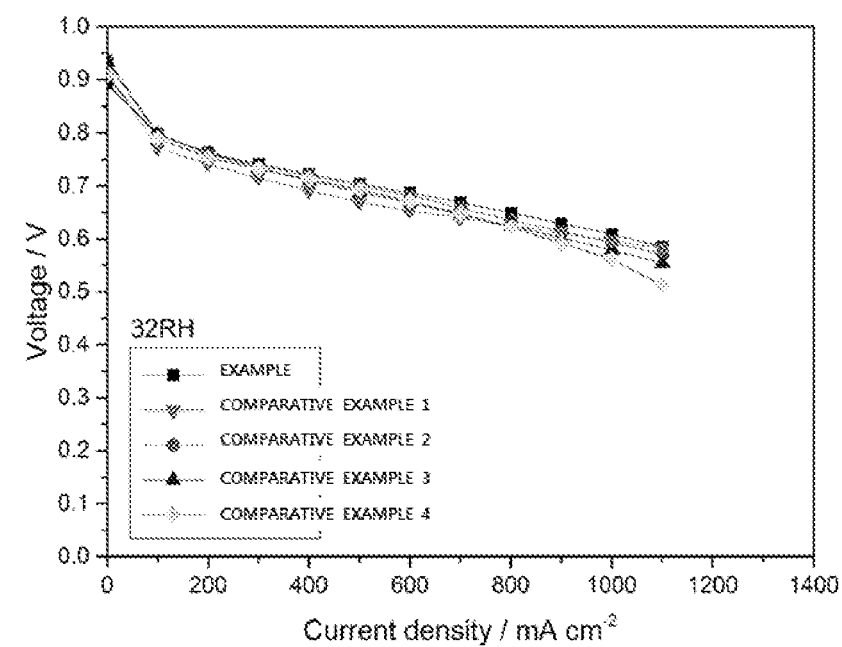

【FIG. 9】
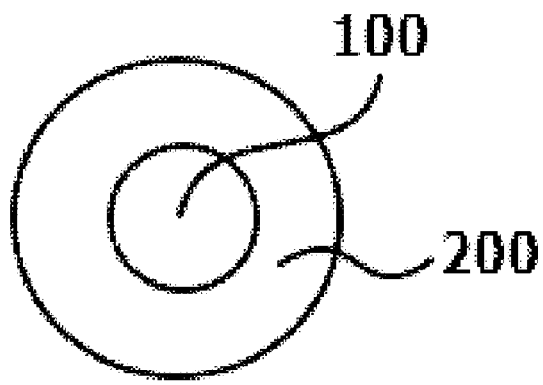
【FIG. 10】
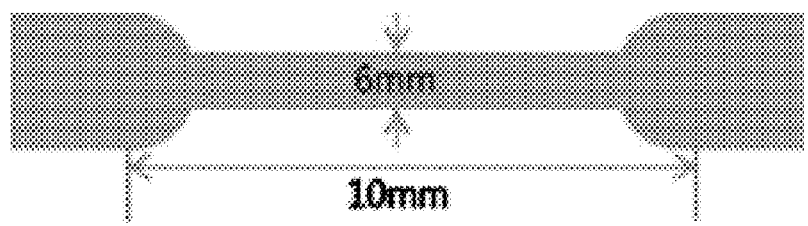

CORE-SHELL PARTICLES, POLYMER ELECTROLYTE MEMBRANE COMPRISING SAME, FUEL CELL OR ELECTROCHEMICAL CELL COMPRISING POLYMER ELECTROLYTE MEMBRANE, AND METHOD FOR MANUFACTURING CORE-SHELL PARTICLES

TECHNICAL FIELD

This application is a National Stage Application of International Application No. PCT/KR2017/001764 filed on Feb. 17, 2017, which claims priority to and the benefit of Korean Patent Application No. 10-2016-0019154, filed with the Korean Intellectual Property Office on Feb. 18, 2016, both of which are incorporated herein in their entirety by reference for all purposes as if fully set forth herein.

The present specification relates to a core-shell particle, a polymer electrolyte membrane comprising the same, a fuel cell or an electrochemical cell comprising the polymer electrolyte membrane, and a method for preparing a core-shell particle.

BACKGROUND ART

With recent predictions about the exhaustion of existing energy resources such as petroleum and coal, interests in alternative energy capable of replacing these have been growing. As one of such alternative energy, fuel cells have received attention with advantages of being highly efficient, not emitting pollutants such as NOx and SOx, and having sufficient fuel to use.

Fuel cells are a power generating system converting chemical reaction energy of fuel and oxidizer to electric energy, and hydrogen, methanol and hydrocarbon such as butane are used as the fuel, and oxygen is typically used as the oxidizer.

Fuel cells include polymer electrolyte membrane-type fuel cells (PEMFC), direct methanol-type fuel cells (DMFC), phosphoric acid-type fuel cells (PAFC), alkaline-type fuel cells (AFC), molten carbonate-type fuel cells (MCFC), solid oxide-type fuel cells (SOFC) and the like. Among these, polymer electrolyte membrane-type fuel cells have been actively studied with their large energy density and high output. Such polymer electrolyte membrane-type fuel cells are different from other fuel cells in using a solid polymer electrolyte membrane instead of a liquid as an electrolyte.

DISCLOSURE

Technical Problem

The present specification is directed to providing a core-shell particle, a polymer electrolyte membrane comprising the same, a fuel cell or an electrochemical cell comprising the polymer electrolyte membrane, and a method for preparing a core-shell particle.

Technical Solution

One embodiment of the present specification provides a core-shell particle comprising a ceramic core and a hydrogel shell provided on a surface of the ceramic core, wherein the hydrogel shell is formed through polymerizing a monomer comprising a first compound having an ethylenically unsaturated group and a functional group capable of forming hydrogen bonds with water; and a second compound having two or more ethylenically unsaturated groups and an inorganic element.

Another embodiment of the present specification provides a polymer electrolyte membrane comprising the core-shell particle.

Another embodiment of the present specification provides a membrane electrode assembly comprising the polymer electrolyte membrane.

Another embodiment of the present specification provides a fuel cell comprising the polymer electrolyte membrane.

Another embodiment of the present specification provides an electrochemical cell comprising the polymer electrolyte membrane.

Another embodiment of the present specification provides a method for preparing a core-shell particle comprising forming a hydrogel shell formed through polymerizing a monomer comprising a first compound having an ethylenically unsaturated group and a functional group capable of forming hydrogen bonds with water; and a second compound having two or more ethylenically unsaturated groups and an inorganic element on a surface of a ceramic core.

Advantageous Effects

A core-shell particle of the present specification has high water moisture capacity and favorable mechanical properties.

A polymer electrolyte membrane of the present specification has high hydrogen ion conductivity under a low humidity condition.

A polymer electrolyte membrane of the present specification has favorable durability regardless of humidification conditions.

A polymer electrolyte membrane the present specification has low fuel and air permeability regardless of humidification conditions.

DESCRIPTION OF DRAWINGS

FIG. 1 is a schematic diagram showing a principle of electricity generation of a fuel cell.

FIG. 2 is a diagram schematically illustrating a structure of a membrane electrode assembly of one embodiment of the present disclosure.

FIG. 3 is a diagram schematically illustrating one example of a fuel cell.

FIG. 4 shows hydrogen ion conductivity of Example 1 and Comparative Examples 1 to 3.

FIG. 5 shows a maximum stress value for polymer electrolyte membranes of Example 1 and Comparative Examples 1 to 3.

FIG. 6 shows performance (RH100%) for unit cells of Example 1 and Comparative Examples 1 to 4.

FIG. 7 shows performance (RH50%) for unit cells of Example 1 and Comparative Examples 1 to 4.

FIG. 8 shows performance (RH32%) for unit cells of Example 1 and Comparative Examples 1 to 4.

FIG. 9 is a sectional diagram of a core-shell particle of one embodiment of the present disclosure.

FIG. 10 shows a shape and a size of a dog bone for measuring tensile strength in Experimental Example 1.

REFERENCE NUMERAL

10: Electrolyte Membrane
20, 21: Catalyst Layers 30, 31: Gas Diffusion layers
50: Cathode
51: Anode
60: Stack
70: Oxidizer Supply Unit
80: Fuel Supply Unit
81: Fuel Tank
82: Pump
100: Ceramic Core
200: Hydrogel Shell

MODE FOR DISCLOSURE

Hereinafter, the present specification will be described in detail.

The present specification provides a core-shell particle comprising a ceramic core and a hydrogel shell provided on a surface of the ceramic core.

An average diameter of the core-shell particles varies depending on an average diameter of the ceramic cores and is not particularly limited, however, an average diameter of the core-shell particles may be greater than or equal to 5 nm and less than or equal to 1 μm. In this case, mechanical properties may be enhanced even with a small content.

In the present specification, ceramic refers to a material formed only with non-metallic elements in the periodic table of the elements (for example, oxygen, nitrogen, boron, carbon, silicon and the like), or formed with non-metallic elements and metallic elements. The ceramic may be divided into oxide ceramic in which oxygen among non-metallic elements and one or more metallic elements form ionic bonds or covalent bonds, and non-oxide ceramic in which nitrogen, boron, carbon, silicon and the like other than oxygen among non-metallic elements and one or more metallic elements form ionic bonds or covalent bonds.

The ceramic core is not particularly limited as long as it is a particle formed with a ceramic material, however, the ceramic core may include oxide ceramic or non-oxide ceramic, and examples of the ceramic core may each include at least one of ceria ($CeO_2$), silica, tin oxide ($SnO_2$), titanium dioxide ($TiO_2$), alumina ($Al_2O_3$), zeolite, zirconia ($ZrO_2$), silicon nitride and silicon carbide.

An average diameter of the ceramic cores may be greater than or equal to 2 nm and less than or equal to 800 nm. In this case, mechanical properties may be enhanced even with a small content.

Gel is a colloidal dispersion system in which a dispersed phase is a solid and a dispersion medium is a liquid, and means maintaining a form without flowing like sol. Both sol and gel are in an intermediate state of a simple fluid (Newton fluid) such as water or oil and a perfectly elastic body (solid following the Hook's Law), and the boundary is not clear.

In the present specification, hydrogel means gel having water as a dispersion medium. The hydrogel may be formed by a hydrophilic polymer that has a three-dimensional network structure and non-crystalline structure containing water and expanding.

The hydrogel shell may be formed through polymerizing a monomer comprising a first compound having an ethylenically unsaturated group and a functional group capable of forming hydrogen bonds with water; and a second compound having two or more ethylenically unsaturated groups and an inorganic element.

A degree of polymerization of a hydrophilic polymer forming the hydrogel shell may be greater than or equal to 300 and less than or equal to 10,000.

A weight average molecular weight of a hydrophilic polymer forming the hydrogel shell may be greater than or equal to 50,000 and less than or equal to 1,000,000.

An average thickness of the hydrogel shells may vary depending on the water content, and for example, may be greater than or equal to 3 nm and less than or equal to 1 μm.

A hydrogen bond means a chemical bond obtained by hydrogen atom bonding between two atoms. Specifically, a hydrogen bond means a strong intermolecular interaction produced by a hydrogen atom entering between two atoms with strong electronegativity such as an oxygen atom, a nitrogen atom and a fluorine atom. For example, in a water molecule, one oxygen atom and two hydrogen atoms form covalent bonds. Herein, the oxygen atom and the hydrogen atom each offer one electron to form an electron pair and share the electrons. However, the electron pair is located closer to a side of the oxygen atom with larger electron affinity, and the oxygen atom has week negative charge (−), and relatively, the hydrogen atom has polarity with weak positive charge (+). Accordingly, hydrogen bonds are formed between water molecules having polarity due to an electrical attraction, and strong cohesiveness is obtained.

The first compound may have a functional group capable of forming hydrogen bonds with water together with an ethylenically unsaturated group. The functional group capable of forming hydrogen bonds with water may be a functional group exhibiting weak polarity obtained by an atom having strong electronegativity such as an oxygen atom, a nitrogen atom or a fluorine atom forming covalent bonds with hydrogen and the shared electrons being weighted on one side.

The functional group capable of forming hydrogen bonds with water is not particularly limited as long as it is capable of forming hydrogen bonds with water, and examples thereof may include at least one of a hydroxyl group (—OH), a sulfonic acid group (—$SO_3H$), a carboxyl group (—COOH), primary amine (—$NH_2$), secondary amine (—NH—) and tertiary amine

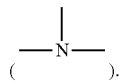

Herein, '—' indicates a substitution position, and types of substituents are not particularly limited as long as the substituent substitutes hydrogen of the amine group. When substituting at least one or more of hydrogen of the amine group, examples of the substituent types may be each independently an alkyl group, an aryl group or a heterocyclic group.

The first compound is not particularly limited as long as it has the functional group capable of forming hydrogen bonds with water together with an ethylenically unsaturated group, and examples thereof may include at least one of N-isopropylacrylamide, N,N-methylenebisacrylamide, vinyl alcohol, hydroxyalkyl ($C_2$-$C_{10}$) methacrylate, hydroxyalkyl ($C_2$-$C_{10}$) acrylate, vinyl pyrrolidone, acrylic acid and styrene sulfonic acid.

The second compound may have two or more ethylenically unsaturated groups and an inorganic element. Herein, the inorganic element means an element excluding carbon, oxygen, hydrogen and nitrogen typically forming organic materials, and the meaning of having an inorganic element means, in the second compound, the inorganic element forming chemical bonds with adjacent other elements.

Herein, the other elements forming chemical bonds with the inorganic element are all elements including carbon, oxygen, hydrogen and nitrogen.

The inorganic element of the second compound may be a metal, a metalloid or a non-metal excluding carbon, oxygen, hydrogen and nitrogen, and examples of the inorganic element of the second compound may include at least one of Si, P, Ti, Zn, Ni, Pt, Au, Co, Cu, In, Sn, Pb, Ag, Fe, Mn, Ir and Ge.

The inorganic element of the second compound may form chemical bonds with adjacent other elements to form a polyhedron. Specifically, the inorganic element of the second compound may form chemical bonds with adjacent other elements to form a regular hexahedron or a rectangular parallelepiped. This has an advantage of enhancing cross-linking density and mechanical properties of a polymer electrolyte membrane.

The inorganic element of the second compound may include Si.

The second compound may include polyhedral oligomeric silsesquioxane (POSS) having two or more ethylenically unsaturated groups. Specifically, the second compound may include at least one of acrylo-POSS and methacrylo-POSS.

The second compound may be represented by the following Chemical Formula 1.

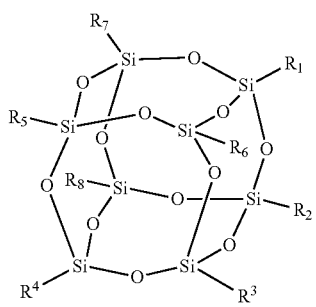

[Chemical Formula 1]

In Chemical Formula 1, $R_1$ to $R_8$ are each independently an ethylenically unsaturated group, an epoxy group, an alkoxy group, a hydroxyl group, a halogen group, an amine group, an alkyl group or an aryl group, and at least two or more of $R_1$ to $R_8$ are an ethylenically unsaturated group.

The ethylenically unsaturated group is not particularly limited as long as it is a substituent having an ethylenically unsaturated group, and examples thereof may include at least one of an acrylic group, a methacrylic group and a vinyl group.

The ethylenically unsaturated group may include at least one of a substituent represented by the following Chemical Formula 2 and a substituent represented by the following Chemical Formula 3.

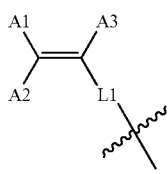

[Chemical Formula 2]

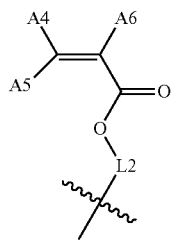

[Chemical Formula 3]

In Chemical Formulae 2 and 3, L1 and L2 are each independently a direct bond, an alkylene group, —Si(A7)(A8)-O—, an arylene group or a divalent heterocyclic group, A1 to A8 are each independently hydrogen, a halogen group, an alkyl group, an aryl group, a cyano group or an amine group.

In the present specification,

means a substitution position of a substituent.

In the present specification, the halogen group may include fluorine, chlorine, bromine, iodine or the like, but is not limited thereto.

In the present specification, the alkyl group may be linear or branched, and, although not particularly limited thereto, the number of carbon atoms is preferably from 1 to 12. Specific examples thereof may include a methyl group, an ethyl group, a propyl group, an isopropyl group, a butyl group, a t-butyl group, a pentyl group, a hexyl group, a heptyl group and the like, but are not limited thereto.

In the present specification, the alkoxy group preferably has 1 to 12 carbon atoms, and more specific examples thereof may include methoxy, ethoxy, isopropyloxy and the like, however, the alkoxy group is not limited thereto.

In the present specification, the aryl group or the arylene group may be monocyclic or multicyclic, and, although not particularly limited thereto, the number of carbon atoms is preferably from 6 to 40. Examples of the monocyclic aryl group may include a phenyl group, a biphenyl group, a terphenyl group, a stilbene and the like, and examples of the multicyclic aryl group may include a naphthyl group, an anthracenyl group, a phenanthrene group, a pyrenyl group, a perylenyl group, a chrysenyl group, a fluorene group and the like, but are not limited thereto.

In addition, examples of the monocyclic arylene group may include a phenylene group, a biphenylene group, a terphenylene group, a divalent stilbene and the like, and examples of the multicyclic arylene group may include a divalent naphthyl group, a divalent anthracenyl group, a divalent phenanthrene group, a divalent pyrenyl group, a divalent perylenyl group, a divalent chrysenyl group, a divalent fluorene group and the like, but are not limited thereto.

In the present specification, the fluorenyl group is a structure linking two cyclic organic compounds through one atom, and examples thereof may include

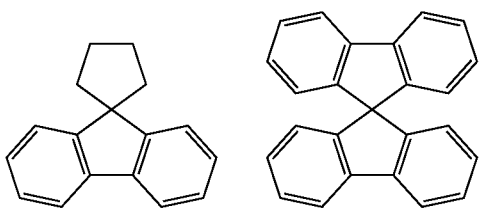

and the like.

In the present specification, the fluorenyl group includes an open fluorenyl group, and herein, the open fluorenyl group is a structure in which, in a structure linking two cyclic organic compounds through one atom, linkage of one cyclic compound is broken, and examples thereof may include

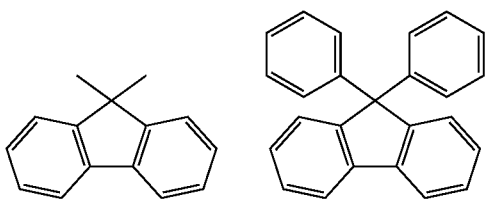

and the like.

In the present specification, the amine group may be —NH$_2$, a secondary amine group or a tertiary amine group, and, depending on the types of substituents substituting hydrogen, may include a dialkylamine group, an alkylarylamine group or a diarylamine group. The number of carbon atoms of the amine group is not particularly limited, but is preferably from 1 to 30. Specific examples of the amine group may include a methylamine group, a dimethylamine group, an ethylamine group, a diethylamine group, a phenylamine group, a naphthylamine group, a biphenylamine group, an anthracenylamine group, a 9-methylanthracenylamine group, a phenylnaphthylamine group, a ditolylamine group, a phenyltolylamine group, a triphenylamine group and the like, but are not limited thereto.

In the present specification, examples of the diarylamine group mean a substituted or unsubstituted monocyclic diarylamine group, a substituted or unsubstituted multicyclic diarylamine group, or a substituted or unsubstituted monocyclic and multicyclic diarylamine group.

In the present specification, the heterocyclic group is a cyclic group including any one or more of O, N, Si and S as a heteroatom, and, although not particularly limited thereto, the number of carbon atoms is preferably from 2 to 60.

In the present specification, the heterocyclic group may be a heteroaryl group. Examples of the heteroaryl group may include a thiophene group, a furan group, a pyrrole group, an imidazole group, a thiazole group, an oxazole group, an oxadiazole group, a triazole group, a pyridyl group, a bipyridyl group, a triazine group, an acridyl group, a pyridazine group, a quinolinyl group, an isoquinoline group, an indole group, a carbazole group, a benzoxazole group, a benzimidazole group, a benzothiazole group, a benzocarbazole group, a benzothiophene group, a dibenzothiophene group, a benzofuranyl group, a dibenzofuranyl group and the like, but are not limited thereto.

The second compound may comprise at least one of compounds represented by the following Chemical Formulae 4 to 7.

[Chemical Formula 4]

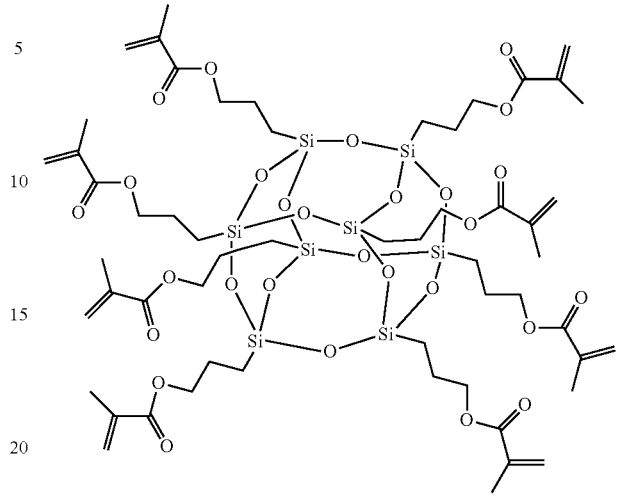

[Chemical Formula 5]

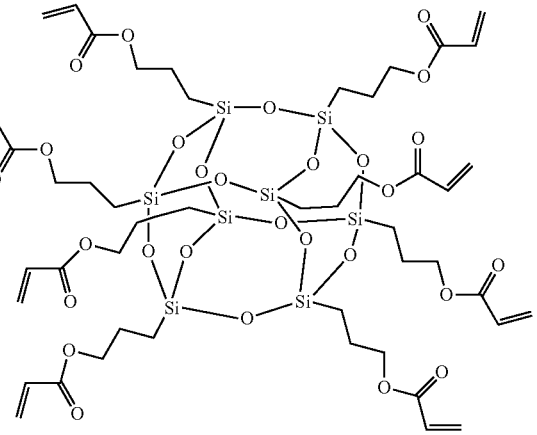

[Chemical Formula 6]

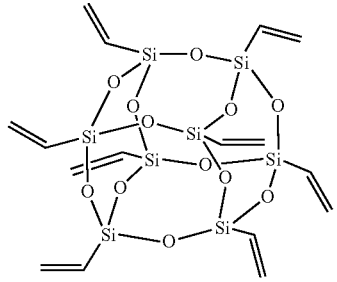

-continued

[Chemical Formula 7]

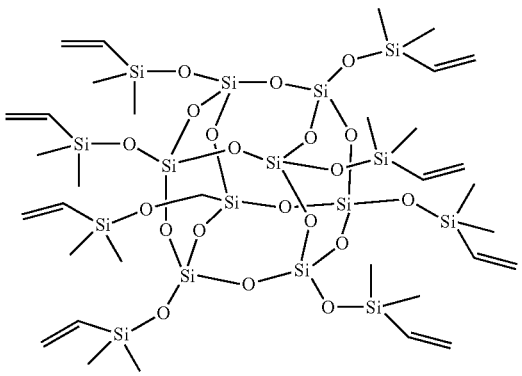

The present specification provides a polymer electrolyte membrane comprising the core-shell particle.

In the present specification, the polymer electrolyte membrane is not particularly limited in the application field as long as it performs a role of a separator while having cation or anion conductivity.

The polymer electrolyte membrane may be a hydrocarbon-based polymer electrolyte membrane or a fluorine-based polymer electrolyte membrane, and preferably, the polymer electrolyte membrane may be a hydrocarbon-based polymer electrolyte membrane comprising a hydrocarbon-based ion conductive polymer.

In one embodiment of the present specification, a polymer electrolyte composition forming the polymer electrolyte membrane may further comprise a solvent and an ion conductive polymer together with the core-shell particles.

The ion conductive polymer means a polymer having ion conductivity, and specifically, may be a polymer having cation conductivity capable of transferring hydrogen cations.

The ion conductive polymer may be one or more hydrocarbon-based polymers, and common materials known in the art may be used. For example, the ion conductive polymer may be formed with one or more types selected from among sulfonated polyetheretherketone, sulfonated polyketone, sulfonated poly(phenylene oxide), sulfonated poly(phenylene sulfide), sulfonated polysulfone, sulfonated polycarbonate, sulfonated polystyrene, sulfonated polyimide, sulfonated polyquinoxaline, sulfonated (phosphonated) polyphosphazene and sulfonated polybenzimidazole.

The weight average molecular weight of the ion conductive polymer may be from tens of thousands to millions. Specifically, the weight average molecular weight of the ion conductive polymer may be selected between greater than or equal to ten thousand and less than or equal to one million.

The solvent for the polymer electrolyte membrane is not particularly limited as long as it is a material capable of reacting with a polymer and dissolving the polymer, and common materials known in the art may be used.

As a method for forming the polymer electrolyte membrane using the polymer electrolyte composition, common methods known in the art may be used, and for example, the polymer electrolyte membrane may be formed through a casting method using the polymer electrolyte composition, or may be formed by impregnating the polymer electrolyte composition into a porous support.

Based on the weight of the ion conductive polymer, the content of the core-shell particles may be greater than or equal to 0.1% by weight and less than or equal to 5% by weight. This has an advantage of maintaining a moisture content in the polymer electrolyte membrane and durability of the polymer electrolyte membrane.

The present specification provides a membrane electrode assembly comprising the polymer electrolyte membrane.

FIG. 1 is a diagram schematically showing a principle of electricity generation of a fuel cell, and a most basic unit generating electricity in a fuel cell is a membrane electrode assembly (MEA), which is formed with an electrolyte membrane (M), and an anode (A) and a cathode (C) formed on both surfaces of this electrolyte membrane (M). When referring to FIG. 1 showing a principle of electricity generation of a fuel cell, an oxidation reaction of fuel (F) such as hydrogen, methanol or hydrocarbon such as butane occurs in an anode (A) to generate hydrogen ions ($H^+$) and electrons ($e^-$), and the hydrogen ions migrate to a cathode (C) through an electrolyte membrane (M). In the cathode (C), the hydrogen ions transferred through the electrolyte membrane (M), an oxidizer (O) such as oxygen, and electrons react to produce water (W). Through such a reaction, electrons migrate to an external circuit.

As illustrated in FIG. 2, the membrane electrode assembly may be provided with an electrolyte membrane (10), and a cathode (50) and an anode (51) placed opposite to each other with this electrolyte membrane (10) in between. Specifically, the cathode may comprise a cathode catalyst layer (20) and a cathode gas diffusion layer (30) consecutively provided from the electrolyte membrane (10), and the anode may comprise an anode catalyst layer (21) and an anode gas diffusion layer (31) consecutively provided from the electrolyte membrane (10).

The anode catalyst layer and the cathode catalyst layer may each comprise a catalyst and an ionomer.

The catalyst is not particularly limited in the type as long as it is capable of performing a role of a catalyst in a fuel cell, and may include one of platinum, a transition metal and an alloy of platinum-transition metal.

Herein, the transition metal is an element of groups 3 to 11 in the periodic table, and examples thereof may include any one of ruthenium, osmium, palladium, molybdenum and rhodium.

Specifically, the catalyst may be selected from the group consisting of platinum, ruthenium, osmium, platinum-ruthenium alloys, platinum-osmium alloys, platinum-palladium alloys, platinum-molybdenum alloys and platinum-rhodium alloys, but is not limited thereto.

The catalysts may be used as they are, or may be used while being supported on a carbon-based carrier.

Preferred examples of the carbon-based carrier may include any one selected from the group consisting of graphite, carbon black, acetylene black, denka black, ketjen black, active carbon, porous carbon, carbon nanotubes, carbon nanofibers, carbon nanohorns, carbon nanorings, carbon nanowires, fullerene (C60) and Super P black, or mixtures of two or more types thereof.

The ionomer performs a role of providing a passage for ions generated from the reaction between fuel such as hydrogen or methanol and a catalyst to migrate to the electrolyte membrane. As the ionomer, Nafion ionomers or sulfonated polymers such as sulfonated polytrifluorostyrene may be specifically used.

Each catalyst ink forming the anode catalyst layer and the cathode catalyst layer may independently comprise a catalyst, an ionomer and a solvent.

As the solvent included in the catalyst ink, any one selected from the group consisting of water, butanol, isopropanol, methanol, ethanol, n-propanol, n-butyl acetate and ethylene glycol, or a mixture of two or more types thereof may be preferably used.

The process of introducing the catalyst layer may be carried out using common methods known in the art, and for example, the catalyst layer may be formed by directly coating the catalyst ink on the polymer electrolyte membrane, or by forming the catalyst layer on a release substrate, thermocompression bonding the result to the polymer electrolyte membrane and then removing the release substrate, or by coating on the gas diffusion layer. Herein, the coating method of the catalyst ink is not particularly limited, and methods of spray coating, tape casting, screen printing, blade coating, inkjet coating, die coating, spin coating or the like may be used.

The anode gas diffusion layer and the cathode gas diffusion layer are each provided on one surface of the catalyst layer, and become a migration path of reaction gases and water while performing a role of a current conductor, and have a porous structure. Accordingly, the gas diffusion layer may be formed comprising a conductive substrate.

As the conductive substrate, common materials known in the art may be used, and preferred examples thereof may include carbon paper, carbon cloth or carbon felt. However, the conductive substrate is not limited thereto.

The gas diffusion layer may have an average thickness of greater than or equal to 200 µm and less than or equal to 500 µm. This has an advantage in that an optimal condition is obtained in terms of minimizing reactant gas transfer resistance through the gas diffusion layer and containing optimum moisture inside the gas diffusion layer.

In the present specification, the polymer electrolyte membrane is provided between the cathode catalyst layer and the anode catalyst layer, and performs a role of a medium passing protons through and separator of air and hydrogen gas. As proton mobility of the polymer electrolyte membrane increases, performance of the membrane electrode assembly is enhanced.

The polymer electrolyte membrane may have an average thickness of greater than or equal to 5 µm and less than or equal to 50 µm. This has an advantage in that an optimal condition is obtained in terms of minimizing an electrolyte membrane gas crossover and minimizing proton ion resistance.

The polymer electrolyte membrane of the present specification comprises the core-shell particle of the present specification, and the core-shell particle absorbs water and allows the membrane electrode assembly to be in a sufficiently wet state.

The polymer electrolyte membrane may be a hydrocarbon-based polymer electrolyte membrane or a fluorine-based polymer electrolyte membrane, and preferably, the polymer electrolyte membrane may be a hydrocarbon-based polymer electrolyte membrane comprising a hydrocarbon-based ion conductive polymer.

In one embodiment of the present specification, the polymer electrolyte composition forming the polymer electrolyte membrane may further comprise a solvent and an ion conductive polymer together with the core-shell particles.

The content of the ion conductive polymer may be controlled depending on a proper ion exchange capacity (IEC) value required for an electrolyte membrane for a fuel cell to use. In the ion conductive polymer synthesis for preparing an electrolyte membrane for a fuel cell, the ion conductive polymer may be designed by calculating a value of ion exchange capacity (IEC) meq./g=mmol/g. Although it varies depending on the needs, the polymer content may be selected within a range of $0.5 \leq IEC \leq 3$.

One embodiment of the present specification reduces the amount of water escaping out of the gas diffusion layer and allows the membrane electrode assembly to be in a sufficiently wet state, and has an advantage in that an external bubbler may not be used or may be simplified.

Based on the weight of the ion conductive polymer, the content of the core-shell particles may be greater than or equal to 0.1% by weight and less than or equal to 5% by weight. This has an advantage of maintaining a moisture content in the polymer electrolyte membrane and durability of the electrolyte membrane.

One embodiment of the present specification has an advantage of enhancing fuel cell performance under a low humidity condition. Furthermore, one embodiment of the present specification has an advantage of enhancing fuel cell performance under an extremely low humidity condition.

A temperature of a gas line is adjusted to be higher than a bubbler setting temperature by approximately 10° C. to 30° C. so that the reactant gas of the fuel cell is not condensed in the gas line when passing through the bubbler heating a metal container filled with water and reaching a battery cell. Herein, relative humidity of the battery cell is calculated by measuring a temperature of water inside the bubbler through which the reactant gas passes, that is, a dew-point temperature, and then applying a relative humidity conversion relation based on a temperature of the battery cell.

Proton ion conductivity of an electrolyte membrane is an important factor in membrane electrode assembly performance, and is greatly affected by relative humidity, and therefore, when measuring electrolyte membrane proton ion conductivity depending on relative humidity, the relative humidity is divided based on a section having a wide variation in the electrolyte membrane proton ion conductivity.

Specifically, the humid condition under a low humidity condition means relative humidity measured at a cell temperature of 70° C., and in the present specification, a low humidity condition is a case where relative humidity is greater than 40% and less than or equal to 65%, and an extremely low humidity condition means a case where relative humidity is greater than or equal to 0% and less than or equal to 40%.

One embodiment of the present specification may reduce influences of humidity changes in the surrounding environment by increasing a water content of the membrane electrode assembly.

The present specification provides a fuel cell comprising the polymer electrolyte membrane.

The present specification provides a fuel cell comprising the membrane electrode assembly. Specifically, the fuel cell may include two or more of the membrane electrode assemblies.

The fuel cell is a fuel cell comprising a stack comprising two of more of the membrane electrode assemblies according to the present specification and a separator provided between the membrane electrode assemblies; a fuel supply unit supplying fuel to the stack; and an oxidizer supply unit supplying an oxidizer to the stack.

FIG. 3 schematically illustrates a structure of the fuel cell, and the fuel cell is formed comprising a stack (60), an oxidizer supply unit (70) and a fuel supply unit (80).

The stack (60) comprises one, two or more of the membrane-electrode assemblies described above, and when two or more of the membrane-electrode assemblies are comprised of, a separator provided therebetween is comprised of. The separator prevents the membrane-electrode assemblies from being electrically connected, and performs a role of transferring fuel and oxidizer supplied from the outside to the membrane-electrode assemblies.

The oxidizer supply unit (70) performs a role of supplying an oxidizer to the stack (60). As the oxidizer, oxygen is typically used, and oxygen or air may be injected to the oxidizer supply unit (70).

The fuel supplying unit (80) performs a role supplying fuel to the stack (60), and may be formed with a fuel tank (81) storing fuel, and a pump (82) supplying the fuel stored in the fuel tank (81) to the stack (60). As the fuel, hydrogen or hydrocarbon fuel in a gas or liquid state may be used. Examples of the hydrocarbon fuel may include methanol, ethanol, propanol, butanol or natural gas.

The present specification provides an electrochemical cell comprising the polymer electrolyte membrane. Specifically, the electrochemical cell comprises the polymer electrolyte membrane provided between an anode and a cathode.

The electrochemical cell means a battery using chemical reactions, and the type is not particularly limited as long as it is provided with the polymer electrolyte membrane, and for example, the electrochemical cell may be a fuel cell, a metal secondary battery or a flow battery.

The present specification provides an electrochemical cell module comprising the electrochemical cell as a unit cell.

The electrochemical cell module may be formed by inserting a bipolar plate between the flow batteries according to one embodiment of the present application, and stacking the result.

The cell module may specifically be used as a power source of electric vehicles, hybrid electric vehicles, plug-in hybrid electric vehicles or power storage systems.

The present specification provides a method for preparing a core-shell particle comprising forming a hydrogel shell on a surface of a ceramic core.

The method for preparing a core-shell particle may cite descriptions provided above for the core-shell particle.

The forming of a hydrogel shell may comprise modifying the surface of the ceramic core; and forming a hydrogel shell on the surface-modified ceramic core through polymerizing a monomer comprising a first compound having an ethylenically unsaturated group and a functional group capable of forming hydrogen bonds with water and a second compound having two or more ethylenically unsaturated groups and an inorganic element from the surface of the surface-modified ceramic core under the presence of the surface-modified ceramic core.

The forming of a hydrogel shell may comprise modifying the surface of the ceramic core.

The modifying of the surface of the ceramic core may comprise reacting a material comprising an ethylenically unsaturated group on the surface of the ceramic core. Specifically, the modifying of the surface of the ceramic core may comprise reacting a compound capable of introducing an ethylenically unsaturated group on the surface of the surface-modified ceramic core by physically or chemically reacting with a reactor group of the ceramic core.

The modifying of the surface of the ceramic core may comprise introducing a functional group such as a hydroxyl group of the ceramic core or increasing a concentration of the functional group, and reacting a compound capable of introducing an ethylenically unsaturated group on the surface of the surface-modified ceramic core by reacting with a reactor group of the ceramic core.

Herein, the compound may be a compound comprising both a reactor group capable of reacting with a reactor group of the ceramic core and an ethylenically unsaturated group to be introduced on the surface of the ceramic core. For example, the compound may comprise at least one of 3-(trimethoxysilyl)propyl methacrylate, 3-(trimethoxysilyl) propyl acrylate, vinyltrimethoxysilane and triethoxyvinylsilane.

The forming of a hydrogel shell may comprise forming a hydrogel shell on the surface-modified ceramic core through polymerizing a monomer comprising a first compound having an ethylenically unsaturated group and a functional group capable of forming hydrogen bonds with water and a second compound having two or more ethylenically unsaturated groups and an inorganic element from the surface of the surface-modified ceramic core under the presence of the surface-modified ceramic core.

Based on the first compound, a molar ratio of the second compound may be greater than or equal to 0.001 and less than or equal to 200.

Mode for Invention

Hereinafter, the present specification will be described in detail with reference to examples. However, the following examples are for illustrative purposes only, and are not to limit the present specification.

EXAMPLE

Example 1

<Silica Surface Modification>

To a solvent of ethanol and water mixed in a volume ratio of 95:5, a 1 vol % solution of 3-methoxysilylpropyl methacrylate and 1 g of silica having an average diameter of 10 nm were introduced, and the result was dispersed for 1 hour through mechanical stirring at room temperature. To the dispersed solution, acetic acid having a concentration of 1 M was added to adjust the pH to 4.5, and the result was further stirred for 20 hours to obtain surface-modified silica.

<Preparation of Core-Shell Particles>

To a 250 ml round flask, 0.5% by weight of the surface-modified silica based on the weight of the whole solution was introduced together with water, a solvent.

After dissolving 2.2 g of N-isopropylacrylamide and 0.4 g of octamethacryl POSS represented by Chemical Formula 4 in 60 ml of water, the pH was adjusted to 4 using a 0.1 N aqueous hydrochloric solution. Herein, a molar ratio of the N-isopropylacrylamide:octamethacryl POSS was 100:1.

This was introduced to a round flask in which the surface-modified silica was dispersed, and the result was stirred for 30 minutes at a rate of 200 rpm. The temperature was raised to 70° C., and 40 ml of an initiator solution dissolving 0.04 g of potassium persulfate was introduced thereto. When the solution became cloudy, the stirring rate was reduced to 100 rpm, and the result was reacted for 4 hours to obtain core-shell particles in which an average thickness of the hydrogel shells is 500 nm or less.

<Preparation of Composite Membrane>

10 mg of the core-shell particles and 1 g of a hydrocarbon-based ionomer (sulfonated polyarylene ether ketone) were mixed and stirred in a dimethyl sulfoxide solvent so that the solution has a concentration of 5%.

This solution was casted on a polyethylene terephthalate film using a 300 μm blade, and then the result was dried for 3 hours at 50° C. and 12 hours at 100° C. to prepare a composite membrane.

<Manufacture of Fuel Cell>

Catalyst layers of an anode and a cathode were thermally bonded with the prepared composite membrane in between under a condition of 2.7 metric ton, 140° C. and 5 minutes to prepare a catalyst-coated composite membrane. Loading amounts of the anode and the cathode catalyst layers were the same of both 0.35±0.02 mg/cm$^2$, and a 3M fluorine-based polymer was used as an electrode ionomer, and Pt/C (TEC10V50E) manufactured by Tanaka Holdings Co., Ltd. Of Japan was used as the catalyst. The active area of the catalyst layer was 25 cm$^2$, and as a gas diffusion layer, 10BB (300 μm) manufactured by SGL was used for both the anode and the cathode.

Comparative Example 1

Without the core-shell particles, 1 g of a hydrocarbon-based ionomer (sulfonated polyarylene ether ketone) was stirred in a dimethyl sulfoxide solvent so that the solution has a concentration of 5%. Using this solution, a polymer electrolyte membrane was obtained in the same manner as the method of preparing the composite membrane of Example 1.

Using the prepared polymer electrolyte membrane, a fuel cell was manufactured in the same manner as the method of manufacturing the fuel cell of Example 1.

Comparative Example 2

10 mg of silica and 1 g of a hydrocarbon-based ionomer (sulfonated polyarylene ether ketone) were mixed and stirred in a dimethyl sulfoxide solvent so that the solution has a concentration of 5%. Using this solution, a composite membrane was obtained in the same manner as the method of preparing the composite membrane of Example 1.

Using the prepared composite membrane, a fuel cell was manufactured in the same manner as the method of manufacturing the fuel cell of Example 1.

Comparative Example 3

<Preparation of Hydrogel Particles>

After dissolving 2.2 g of N-isopropylacrylamide, 0.4 g of octamethacryl POSS represented by Chemical Formula 4 in 60 ml of water, the pH was adjusted to 4 using a 0.1 N aqueous hydrochloric solution. The temperature was raised to 70° C., and 40 ml of an initiator solution dissolving 0.04 g of potassium persulfate was introduced thereto. When the solution became cloudy, the stirring rate was reduced to 100 rpm, and the result was reacted for 4 hours.

<Preparation of Composite Membrane>

10 mg of the hydrogel particles synthesized above and 1 g of a hydrocarbon-based ionomer (sulfonated polyarylene ether ketone) were mixed and dissolved in a dimethyl sulfoxide solvent so that the solution has a concentration of 5%. This solution was casted on a polyethylene terephthalate film using a 300 μm blade, and then the result was dried for 3 hours at 50° C. and 12 hours at 100° C. to prepare a composite membrane.

<Manufacture of Fuel Cell>

Catalyst layers of an anode and a cathode were thermally bonded with the prepared composite membrane in between under a condition of 2.7 metric ton, 140° C. and 5 minutes to prepare a catalyst-coated composite membrane. Loading amounts of the anode and the cathode catalyst layers were the same of both 0.35±0.02 mg/cm$^2$, and a 3M fluorine-based polymer was used as an electrode ionomer, and Pt/C (TEC10V50E) manufactured by Tanaka Holdings Co., Ltd. Of Japan was used as the catalyst. The active area of the catalyst layer was 25 cm$^2$, and as a gas diffusion layer, 10BB (300 μm) manufactured by SGL was used for both the anode and the cathode.

Comparative Example 4

<Silica Surface Modification>

To a solvent of ethanol and water mixed in a volume ratio of 95:5, a 1 vol % solution of 3-methoxysilylpropyl methacrylate and 1 g of silica having an average diameter of 10 nm were introduced, and the result was dispersed for 1 hour through mechanical stirring at room temperature. To the dispersed solution, acetic acid having a concentration of 1 M was added to adjust the pH to 4.5, and the result was further stirred for 20 hours to obtain surface-modified silica.

<Preparation of Core-Shell Particles>

To a 250 ml round flask, 0.5% by weight of the surface-modified silica based on the weight of the whole solution was introduced together with water, a solvent.

After introducing 2.2 g of N-isopropylacrylamide to the surface-modified silica-dispersed round flask, the result was stirred for 30 minutes at a rate of 200 rpm. The temperature was raised to 70° C., and 40 ml of an initiator solution dissolving 0.04 g of potassium persulfate was introduced thereto. When the solution became cloudy, the stirring rate was reduced to 100 rpm, and the result was reacted for 4 hours to obtain core-shell particles in which an average thickness of the hydrogel shells is 500 nm or less.

<Preparation of Composite Membrane>

10 mg of the core-shell particles synthesized above and 1 g of a hydrocarbon-based ionomer (sulfonated polyarylene ether ketone) were mixed and stirred in a dimethyl sulfoxide solvent so that the solution has a concentration of 5%. This solution was casted on a polyethylene terephthalate film using a 300 μm blade, and then the result was dried for 3 hours at 50° C. and 12 hours at 100° C. to prepare a composite membrane.

<Manufacture of Fuel Cell>

Catalyst layers of an anode and a cathode were thermally bonded with the prepared composite membrane in between under a condition of 2.7 metric ton, 140° C. and 5 minutes to prepare a catalyst-coated composite membrane. Loading amounts of the anode and the cathode catalyst layers were the same of both 0.35±0.02 mg/cm$^2$, and a 3M fluorine-based polymer was used as an electrode ionomer, and Pt/C (TEC10V50E) manufactured by Tanaka Holdings Co., Ltd. Of Japan was used as the catalyst. The active area of the catalyst layer was 25 cm$^2$, and as a gas diffusion layer, 10BB (300 μm) manufactured by SGL was used for both the anode and the cathode.

Experimental Example 1

After cutting the polymer electrolyte membranes (composite membranes) of Example 1 and Comparative Examples 1 to 3 into a dog bone shape with a size shown in FIG. 10, tensile strength was measured at a rate of 10 mm/min.

As a result, maximum strength values of the polymer electrolyte membranes (composite membranes) of Example 1 and Comparative Examples 1 to 3 are shown as a graph in FIG. 5.

Experimental Example 2

Cell performance was evaluated by connecting the unit cells of Example 1 and Comparative Examples 1 to 4 to a cell evaluation device (Nara cell-tech., Korea). As for the anode flux, hydrogen was flowed down at 300 ml/min, and as for the cathode flux, air was flowed down at 1200 ml/min, and a polarization curve was measured at 70° C. while varying humidity to RH 100%, RH 50% or RH 32%. Before measuring the polarization curve, constant voltage operation was performed 100 times at 0.6 V for 5 minutes and 0.3 V for 10 seconds at RH 100% for cell activation, and herein, the fuel stoichiometry was hydrogen/air=8.6/14.5 (0.2 A/cm$^2$, 1 atm, 0° C.). When a constant current value was obtained at 0.6 V through the activation process, the polarization curve was measured.

The polarization curve was measured at OCV while increasing a current by approximately 100 mA/cm$^2$ each, and data were collected up to 37.5 A at RH 100% and RH 50%, and up to 27.5 A at RH 32%.

Experimental Example 3

Each of the membranes prepared in Example 1 and Comparative Examples 1 to 3 was cut into a size of 10 mm×35 mm, and clamped to a 4 probe cell for measuring hydrogen ion conductivity. The cell was maintained for 4 hours at a temperature of 70° C., and at humidity of RH 100%, RH 50% and RH32% each, and then an impedance spectrum was obtained while applying 1 MHz of an alternating current. Herein, the value meeting the x-axis in the impedance spectrum represents membrane resistance, and hydrogen ion conductivity was obtained by substituting this value to the following Equation 1. The results are shown in FIG. 4.

Hydrogen Ion Conductivity=(Length of Membrane)/{(Resistance)×(Width of Membrane)×(Thickness of Membrane)}   [Equation 1]

The invention claimed is:

1. A core-shell particle comprising:
a ceramic core; and
a hydrogel shell provided on a surface of the ceramic core, wherein the hydrogel shell is formed through polymerizing a monomer comprising a first compound having an ethylenically unsaturated group and a functional group capable of forming hydrogen bonds with water; and a second compound having two or more ethylenically unsaturated groups and an inorganic element, and
wherein the first compound includes at least one of N-isopropylacrylamide, N,N-methylenebisacrylamide, vinyl alcohol, hydroxyalkyl(C2-C10) methacrylate, hydroxyalkyl(C2-C10) acrylate, vinyl pyrrolidone and acrylic acid.

2. The core-shell particle of claim 1, wherein the inorganic element of the second compound includes at least one of Si, P, Ti, Zn, Ni, Pt, Au, Co, Cu, In, Sn, Pb, Ag, Fe, Mn, Ir and Ge.

3. The core-shell particle of claim 1, wherein the inorganic element of the second compound includes Si.

4. The core-shell particle of claim 1, wherein the second compound includes polyhedral oligomeric silsesquioxane (POSS) having two or more ethylenically unsaturated groups.

5. The core-shell particle of claim 1, wherein the ceramic core includes at least one of ceria (CeO$_2$), zirconia (ZrO$_2$), tin oxide (SnO$_2$), titanium dioxide (TiO$_2$) and silica (SiO$_2$).

6. The core-shell particle of claim 1, wherein the ceramic core has an average diameter of greater than or equal to 2 nm and less than or equal to 800 nm.

7. The core-shell particle of claim 1, wherein the hydrogel shell has an average thickness of greater than or equal to 3 nm and less than or equal to 1 μm.

8. A polymer electrolyte membrane comprising the core-shell particle of claim 1.

9. A membrane electrode assembly comprising the polymer electrolyte membrane of claim 8.

10. A fuel cell comprising the polymer electrolyte membrane of claim 8.

11. An electrochemical cell comprising the polymer electrolyte membrane of claim 8.

12. A method for preparing a core-shell particle comprising
forming a hydrogel shell formed through polymerizing a monomer comprising a first compound having an ethylenically unsaturated group and a functional group capable of forming hydrogen bonds with water; and
a second compound having two or more ethylenically unsaturated groups and an inorganic element on a surface of a ceramic core,
wherein the first compound includes at least one of N-isopropylacrylamide, N,N-methylenebisacrylamide, vinyl alcohol, hydroxyalkyl(C2-C10) methacrylate, hydroxyalkyl(C2-C10) acrylate, vinyl pyrrolidone and acrylic acid.

13. The method for preparing a core-shell particle of claim 12, wherein the forming of a hydrogel shell comprises modifying the surface of the ceramic core; and forming a hydrogel shell on the surface-modified ceramic core through polymerizing a monomer comprising a first compound having an ethylenically unsaturated group and a functional group capable of forming hydrogen bonds with water and a second compound having two or more ethylenically unsaturated groups and an inorganic element from the surface of the surface-modified ceramic core under the presence of the surface-modified ceramic core.

14. The method for preparing a core-shell particle of claim 12, wherein the inorganic element of the second compound includes Si.

15. The method for preparing a core-shell particle of claim 12, wherein the second compound includes polyhedral oligomeric silsesquioxane (POSS) having two or more ethylenically unsaturated groups.

16. The method for preparing a core-shell particle of claim 12, wherein the ceramic core includes at least one of ceria (CeO$_2$), zirconia (ZrO$_2$), tin oxide (SnO$_2$), titanium dioxide (TiO$_2$) and silica (SiO$_2$).

17. The method for preparing a core-shell particle of claim 12, wherein a molar ratio of the second compound is greater than or equal to 0.001 and less than or equal to 200 based on the first compound.

* * * * *